(12) United States Patent
Kim et al.

(10) Patent No.: US 7,686,326 B2
(45) Date of Patent: Mar. 30, 2010

(54) LOW RISK DEPLOYMENT PASSENGER AIRBAG SYSTEM USING SLIM TYPE PASSENGER AIRBAG MODULE

(75) Inventors: Dong Eun Kim, Busan (KR); Young Yeol Park, Busan (KR); Jong Seop Nam, Commerce Township, MI (US); Seung Jae Song, Novi, MI (US)

(73) Assignees: S&T Daewoo Co. Ltd., Busan Si (KR); CIS Teck, LLC, Commerce Township, MI (US)

( * ) Notice: Subject to any disclaimer, the term of this patent is extended or adjusted under 35 U.S.C. 154(b) by 0 days.

(21) Appl. No.: 12/261,858

(22) Filed: Oct. 30, 2008

(65) Prior Publication Data
US 2009/0184495 A1     Jul. 23, 2009

Related U.S. Application Data

(62) Division of application No. 11/657,327, filed on Jan. 24, 2007.

(30) Foreign Application Priority Data
Oct. 27, 2006    (KR)    ...................... 10-2006-0105301

(51) Int. Cl.
*B60R 21/205*    (2006.01)
*B60R 21/217*    (2006.01)

(52) U.S. Cl. .................................... 280/728.2; 280/732
(58) Field of Classification Search ............... 280/728.2, 280/732; *B60R 21/205, 21/217*
See application file for complete search history.

(56) References Cited

U.S. PATENT DOCUMENTS
3,817,553 A    6/1974    Wilfert
(Continued)

FOREIGN PATENT DOCUMENTS
JP    05208651 A    *  8/1993
(Continued)

*Primary Examiner*—Faye M. Fleming
*Assistant Examiner*—Laura Freedman
(74) *Attorney, Agent, or Firm*—Volpe and Koenig, P.C.

(57) ABSTRACT

Disclosed herein is a low risk deployment passenger airbag system using a slim type passenger airbag module which is minimized in height and/or length, such that a top airbag and a mid airbag can be installed in a limited space defined by an instrument panel. In the slim type passenger airbag module used in the low risk deployment passenger airbag system, a disk type inflator is used, unlike the conventional art using a cylindrical inflator, an upper end of the disk inflator is disposed in an airbag housing, and a retainer for supporting the cushion is brought into close contact with the bottom (or the rear surface) of the airbag housing in which the disk type inflator is provided, thus minimizing the height and/or length of the passenger airbag module. Thereby, the slim type passenger airbag module is suitable for the low risk deployment passenger airbag system. Furthermore, in the low risk deployment passenger airbag system, to deploy the cushions of the top and mid airbags substantially horizontally towards a passenger seat when a vehicle accident occurs, the distance between the top airbag and the mid airbag is within a range from 100 mm to 250 mm, the top airbag is inclined at an angle ranging from 60° to 75° with respect to the horizontal surface, and the mid airbag is inclined at 15° or less with respect to the horizontal surface.

10 Claims, 18 Drawing Sheets

U.S. PATENT DOCUMENTS

| | | |
|---|---|---|
| 4,043,572 A | 8/1977 | Hattori et al. |
| 5,064,218 A | 11/1991 | Hartmeyer |
| 5,255,937 A | 10/1993 | EmamBakhsh et al. |
| 5,350,191 A | 9/1994 | Kokeguchi et al. |
| 5,439,246 A | 8/1995 | Ravenberg et al. |
| 5,460,401 A | 10/1995 | Gans et al. |
| 5,527,065 A * | 6/1996 | Saberan et al. ............ 280/728.3 |
| 5,538,277 A * | 7/1996 | Frary et al. ............... 280/728.2 |
| 5,584,502 A | 12/1996 | Phillion et al. |
| 5,906,395 A * | 5/1999 | Isaji et al. ................ 280/743.1 |
| 5,992,876 A | 11/1999 | Gray |
| 6,431,583 B1 | 8/2002 | Schneider |
| 6,431,586 B1 | 8/2002 | Eyrainer et al. |
| 6,471,242 B2 | 10/2002 | Schneider |
| 6,712,384 B2 | 3/2004 | Abe |
| 6,854,760 B2 | 2/2005 | Whited et al. |
| 6,955,240 B2 * | 10/2005 | Ahn et al. .................... 280/736 |
| 7,070,201 B2 * | 7/2006 | Song et al. ................. 280/730.1 |
| 7,328,913 B2 | 2/2008 | Song et al. |
| 2005/0087967 A1 | 4/2005 | DePottey et al. |
| 2005/0161918 A1 | 7/2005 | Bito |
| 2005/0269808 A1 | 12/2005 | Song et al. |
| 2006/0103121 A1* | 5/2006 | Song et al. ................... 280/732 |
| 2007/0024036 A1 | 2/2007 | Song et al. |
| 2007/0210565 A1* | 9/2007 | Song et al. ................... 280/732 |
| 2008/0100041 A1* | 5/2008 | Kim et al. ................. 280/728.2 |

FOREIGN PATENT DOCUMENTS

| | | |
|---|---|---|
| KR | 2002024861 A * | 4/2002 |
| WO | 2005120905 A2 | 12/2005 |

* cited by examiner (prior art)

(prior art)

(prior art)

(prior art)

(prior art)

(prior art)

LOW RISK DEPLOYMENT PASSENGER AIRBAG SYSTEM USING SLIM TYPE PASSENGER AIRBAG MODULE

CROSS REFERENCE TO RELATED APPLICATIONS

This application is a division of U.S. patent application Ser. No. 11/657,327, filed Jan. 24, 2007, which is incorporated by reference as if fully set forth.

BACKGROUND OF THE INVENTION

1. Field of Invention

The present invention relates generally to passenger airbag modules mounted to instrument panels of vehicles and low risk deployment passenger airbag systems having top airbags and mid airbags which are respectively mounted to upper surfaces and front surfaces of instrument panels and, more particularly, to a low risk deployment passenger airbag system using a slim type passenger airbag module which is minimized in height and/or length, such that two passenger airbag modules, that is, a top airbag and a mid airbag, can be installed in a limited space defined by an instrument panel.

2. Description of the Related Art

Generally, airbag modules are installed in vehicles to protect drivers and passengers from major impact when a vehicle crash occurs. The airbags are classified into a driver airbag (DAB), which is installed in a steering handle of a driver's seat, and a passenger airbag (PAB), which is installed in an instrument panel across from a passenger seat, depending on the installation position thereof.

Particularly, the present invention relates to passenger airbags. The passenger airbags are classified into a top airbag, which is mounted to the horizontal upper surface of the instrument panel, and a mid airbag, which is mounted to a vertical surface of the instrument panel above a glove box, depending on an installation position thereof.

As shown in FIGS. 1a and 1b, a conventional passenger airbag system includes a single passenger airbag module, which is provided inside an upper or front surface of an instrument panel. As an example, FIG. 1a shows a conventional airbag system which includes a single top airbag module provided inside the upper surface of the instrument panel. FIG. 1b shows a conventional airbag system which includes a single mid airbag module provided inside the front surface of the instrument panel.

However, the conventional passenger airbag system having the single top or mid airbag is problematic in that, when a vehicle accident occurs, a cushion inflated towards a passenger seat strikes the head of an out-of-position occupant (OOP), such as a child or a small adult, thus resulting in a severe injury to his/her neck. In detail, in the case of FIG. 1a, when a vehicle accident occurs, as designated by the dotted lines, while the cushion 5 of the top airbag is deployed, a component force 6 that is deployed downwards is generated. The downward deployment component force 6 strikes the head of a child 1, who is adjacent to the instrument panel, in a downward direction, thus resulting in a severe injury to the neck of the child 1. In the case of FIG. 1b, while the airbag is deployed, a mid airbag cushion 9 generates a component force 10 that is deployed upwards. The upward deployment component force 10 strikes the jaw of an out-of-position child 1 in an upward direction, thus resulting in a severe injury to the neck of the child.

In an effort to overcome the above problems, recently, a low risk deployment passenger airbag system, in which two airbags are respectively mounted to the upper and front surfaces of the instrument panel, was developed. The low risk deployment passenger airbag system includes two airbag modules, that is, a top airbag module and a mid airbag module, which have small volumes and are respectively mounted to the upper surface and the front surface of the instrument panel. Thus, when the airbag is deployed, that is, when the top airbag and the mid airbag are deployed, they are operated in conjunction with each other, so that they are substantially horizontally deployed towards the head and the chest of the occupant, thus preventing the downward or upward deployment component force 6 or 10 resulting in an injury to the neck of the out-of-position child.

FIG. 2 shows a preferred embodiment of "LOW RISK DEPLOYMENT PASSENGER AIRBAG SYSTEM" proposed in PCT international publication No. WO 2005/120905, which was filed by the inventor of the present invention.

As shown in the drawing, the conventional low risk deployment passenger airbag system includes a top airbag, which is mounted to the upper surface of an instrument panel, and a mid airbag, which is mounted to the front surface of the instrument panel. In the conventional low risk deployment passenger airbag system having the above-mentioned construction, when a vehicle accident occurs, while the airbags are operated, a top airbag cushion 14 and a mid airbag cushion 16 comes into contact with each other and are operated in conjunction with each other, so that they are substantially horizontally deployed towards the head and the chest of an adult occupant 2 who is seated on a passenger seat (refer to the arrows designated by the reference numerals 17 and 18). Therefore, the neck of an out-of-position child or small adult 1 is prevented from being injured by the deployment of the airbag.

The present invention provides a slim type passenger airbag module for such low risk deployment passenger airbag systems. That is, in such a low risk deployment passenger airbag system, because the top airbag module and the mid airbag module must be mounted to the rear surface of the instrument panel in a limited space defined by the instrument panel, the installation area and space are insufficient. Therefore, in order to install two passenger airbag modules in the limited space of the instrument panel, a slim type passenger airbag module having a low height, that is, a small size, is required.

Furthermore, the present invention relates to an installation relationship between the top airbag and the mid airbag provided in the low risk deployment passenger airbag system, that is, it relates to the distance and angle between the two passenger airbag modules. In detail, the low risk deployment passenger airbag system must be constructed such that, when the airbag system is operated, the cushions of the top airbag and the mid airbag are horizontally deployed by contact, that is, interference therebetween. For this, the distance and angle between the top airbag and the mid airbag must be defined within appropriate ranges. Therefore, a slim type passenger airbag module that meets the above requirements is necessary.

FIGS. 3a and 3b are a perspective view and a sectional view showing an example of a conventional passenger airbag module. As shown in the drawings, the conventional passenger airbag module 100 includes a box-shaped airbag housing 20, a cylindrical inflator 31, which discharges deployment gas, a cushion 40, which is inflated towards a passenger seat using deployment gas, and a retainer 50, which supports the cushion 40.

In detail, the airbag housing 20 includes a cushion housing 21 and an inflator housing 22. The cushion 40, which is folded into a predetermined shape, is received in the cushion housing 21. The cylindrical inflator 31 is installed in the inflator housing 22. Here, the cushion housing 21 has an opening 25, through which the cushion 40 is inflated and is deployed by deployment gas towards the passenger seat, and a mounting flange 27, which has bolt holes and is integrally provided around the rim of the opening 25.

The inflator housing 22 has a cylindrical shape and is open at an upper end thereof. Coupling holes are formed through opposite ends of the inflator housing 22, so that the opposite ends of the cylindrical inflator 31 are inserted into and fastened to the coupling holes in the inflator housing 22. Furthermore, a bracket 64, which fastens the passenger airbag module to a tie bar 63, is mounted to the outer surface of the lower end of the inflator housing 22.

The cylindrical inflator 31 has a can structure. A gas discharge hole, through which deployment gas is discharged when a vehicle accident occurs, is formed at a predetermined position through the inflator 30. Furthermore, a bolt 32 is provided on one end of the cylindrical inflator 31, so that the cylindrical inflator 31 can be fastened to the end of the inflator housing 22 by tightening the bolt 32 into a nut 34. A connector 38 for electrical connection of the cylindrical inflator 31 is coupled to the other end of the cylindrical inflator 31.

The retainer 50 is fixed between the cushion housing 21 and the inflator housing 22, and fastens an inlet part of the cushion 40 to the cushion housing 21. In addition, a plurality of passing holes 51, through which deployment gas passes, and a plurality of bolt holes for the retainer 50 to the cushion housing 21 are formed through the retainer 50. The inlet part of the cushion 40 is fastened to the retainer 50 by coupling bolts.

Meanwhile, FIG. 4 is a schematic sectional view showing an instrument panel, to which a top airbag and a mid airbag are mounted. As shown in the drawing, the top airbag T is mounted to the upper surface of the instrument panel 65, and the mid airbag M is mounted to the front surface of the instrument panel 65. As such, the two passenger airbag modules T and M are installed in a limited installation area A, which is defined inside the rear surface of the instrument panel.

That is, the top airbag module T cannot be disposed in an area from a junction between a windshield glass G and the instrument panel 65 to a position spaced apart from the junction by a predetermined distance (L), in order to provide space for the rotation of an airbag door. Furthermore, because a glove box (GB) must be installed inside the front panel of the instrument panel 65, the mid airbag module M cannot be installed in that area. In addition, the top airbag module T and the mid airbag module M must be coupled to the tie bar 63, the passenger airbag modules T and M cannot be disposed below the tie bar 63. Therefore, the area for installation of the two passenger airbag modules T and M is limited to the shaded area A, which is defined in the dotted line. Furthermore, recently, vehicles, in which a concave depression is formed in the upper surface of the instrument panel or the front surface of the instrument panel is curved, are increasing in number. Thus, the area A for installation of the two passenger airbag modules T and M is further reduced.

Therefore, a slim type passenger airbag module, which makes it possible to install two airbag modules in the limited installation area A inside the instrument panel, is required. Furthermore, the slim type passenger airbag module, which can be applied to even the curved surface of the instrument panel, is required. In addition, the slim type passenger airbag module, which can meet requirements, such as the distance (D) between the top airbag T and the mid airbag M and inclination angles ($\alpha$) and ($\theta$) thereof, such that the cushions of the top airbag T and the mid airbag M can be horizontally deployed by operating in conjunction with each other, is required.

SUMMARY OF THE INVENTION

Accordingly, the present invention has been made keeping in mind the above problems occurring in the prior art, and an object of the present invention is to provide a low risk passenger airbag system which includes at least one slim type passenger airbag module having minimal height and/or length such that, when the airbag is operated, cushions of a top airbag and a mid airbag, which are respectively mounted to the upper and front surfaces of an instrument panel, can be substantially horizontally deployed in conjunction with each other.

Another object of the present invention is to provide a low risk passenger airbag system in which at least one of the top airbag and the mid airbag, which are installed in a limited space defined inside the rear surface of the instrument panel, comprises a slim type passenger airbag module having minimal height and/or length such that the distance between the top airbag and the mid airbag can be within a predetermined range, and the inclination angles of the top airbag and the mid airbag with respect to the horizontal surface can be within predetermined ranges.

Another object of the present invention is to provide a low risk passenger airbag system in which at least one of the top airbag and the mid airbag, which are respectively mounted to the upper surface and the front surface of the instrument panel, comprises a slim type passenger airbag module having minimal height and/or length, such that it can meet the low risk deployment criteria for passenger airbags set by the National Highway Traffic Safety Administration (NHTSA).

In order to accomplish the above object, in a first aspect of a slim type passenger airbag module used in the low risk deployment passenger airbag system, a disk type inflator is used, unlike the conventional art, which uses a cylindrical inflator, and an upper end of the disk inflator is disposed in an airbag housing. Furthermore, a retainer for supporting the cushion is brought into close contact with the bottom of the airbag housing and integrally fastens the cushion and the disk type inflator to the airbag housing, thus reducing the height and/or length of the passenger airbag module.

In a second aspect of a slim type passenger airbag module used in the low risk deployment passenger airbag system, the opening in the airbag housing, through which the cushion is deployed, and the upper surface of the disk type inflator, which supplies deployment gas into the cushion, are perpendicular to each other, so that the height of the opening can be determined independent of the size of the disk type inflator, thus reducing the height or length of the passenger airbag module.

In a preferred embodiment of the low risk deployment passenger airbag system according to the present invention having passenger airbag modules respectively mounted to the upper surface and the front surface of an instrument panel, at least one of the passenger airbag modules comprises a slim type passenger airbag module, comprising: a box-shaped airbag housing, having an opening in a front end thereof, and a flange provided around the opening of the box-shaped airbag housing; a disk type inflator, an upper end of which is inserted into the airbag housing through a circular insert hole formed through a rear surface of the airbag housing, which is opposite the opening; a cushion stored in the airbag housing in a folded state such that the cushion is deployed towards a passenger seat through the opening by deployment gas discharged from the disk type inflator; and a retainer fastening both an inlet part of the cushion and a ring-shaped flange, provided around the circumferential outer surface of the disk type inflator, to the rear surface of the airbag housing a locking bolt, the retainer having a circular through hole through which the upper end of the disk type inflator passes.

In another embodiment of the low risk deployment passenger airbag system having passenger airbag modules respectively mounted to an upper surface and a front surface of an instrument panel, at least one of the passenger airbag modules comprises a slim type passenger airbag module, comprising: a box-shaped airbag housing, having an opening in a front end thereof, and a flange provided around the opening of the box-shaped airbag housing; a disk type inflator, an upper end of which is inserted into the airbag housing through a circular insert hole formed through a bottom of the airbag housing, which is perpendicular to the opening; a cushion stored in the airbag housing in a folded state such that the cushion is deployed towards a passenger seat through the opening by deployment gas discharged from the disk type inflator; and a retainer fastening both an inlet part of the cushion and a ring-shaped flange, provided around a circumferential outer surface of the disk type inflator, to the bottom of the airbag housing a locking bolt, the retainer having a circular through hole, through which the upper end of the disk type inflator passes.

In the low risk deployment passenger airbag system of the present invention, a distance between centers of the two passenger airbag modules, which are respectively mounted to the upper surface and the front surface of the instrument panel, may be within a range from 100 mm to 250 mm, such that, when a vehicle crash occurs, two cushions of the passenger airbag modules are horizontally deployed towards the passenger seat in conjunction with each other.

Furthermore, in the low risk deployment passenger airbag system of the present invention, the airbag module, which is mounted to the upper surface of the instrument panel, may be inclined at an angle ranging from 60° to 75° with respect to a horizontal surface, and the airbag module, which is mounted to the front surface of the instrument panel, may be parallel to the horizontal surface or be inclined at an angle ranging from 0° to 15° with respect to the horizontal surface.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Hereinafter, preferred embodiments of a low risk deployment airbag system using a slim type airbag module according to the present invention will be described in detail with reference to the attached drawings.

Figure 5A:
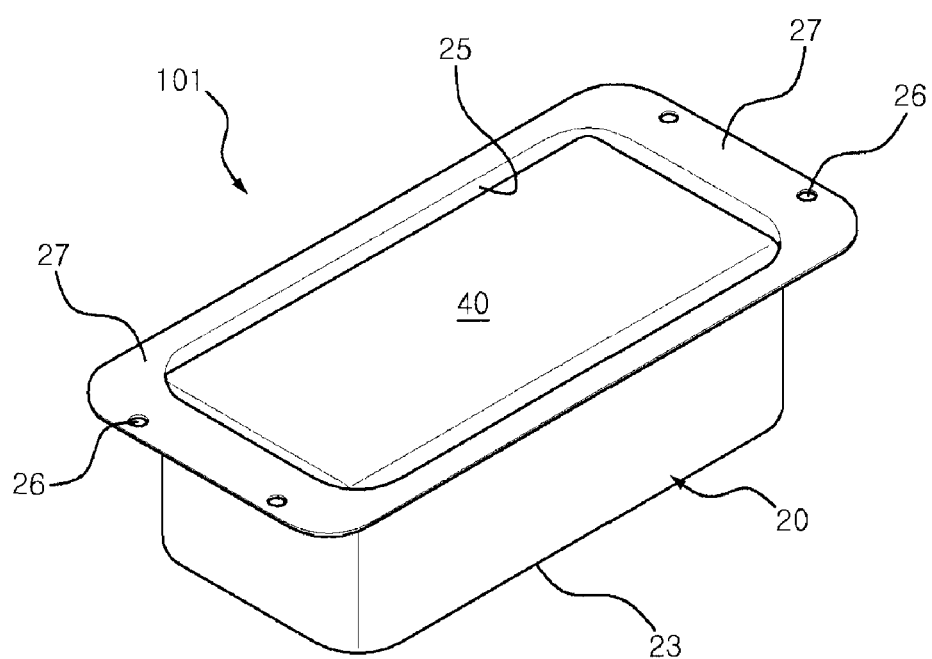
FIGS. 5a, 5b and 5c are a perspective view, an exploded perspective view and a sectional view showing a slim type passenger airbag module used in a low risk deployment passenger airbag system, according to a first embodiment of the present invention.
Figure 5B:
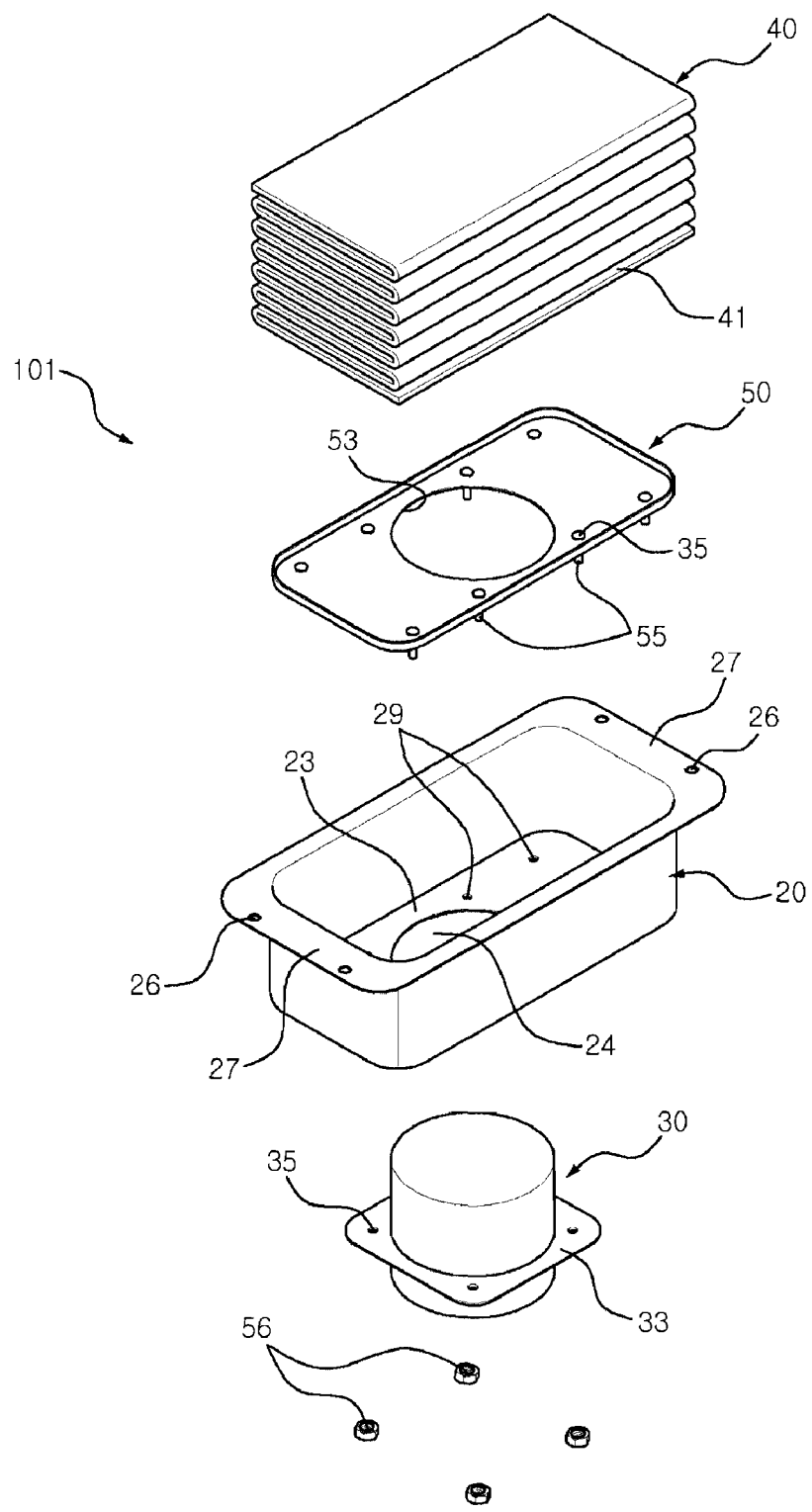
Figure 5C:
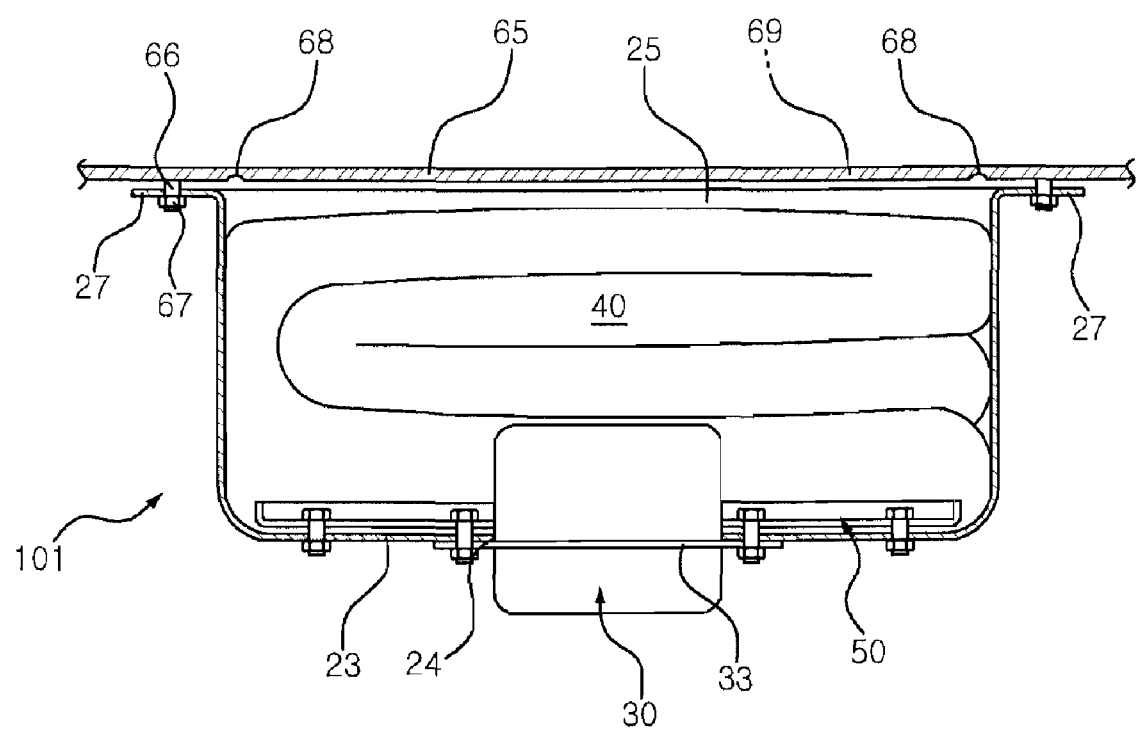

FIGS. 5a, 5b and 5c are a perspective view, an exploded perspective view and a sectional view showing a slim type passenger airbag module 101 used in a low risk deployment passenger airbag system, according to a first embodiment of the present invention.

As shown in the drawings, the slim type passenger airbag module 101 includes a box-shaped airbag housing 20, which has an opening 25 in an upper end thereof, and a disk type inflator 30, which is mounted to the bottom 23 of the airbag housing 20 and discharges deployment gas. The slim type passenger airbag module 101 further includes a cushion 40 to be inflated through the opening 25 towards a passenger seat by deployment gas discharged from the disk type inflator 30, and a retainer 50, which fastens an inlet part 41 (see, FIG. 5b) of the cushion 40 and the disk type inflator 30 to the bottom 23 of the airbag housing 20.

In detail, the box-shaped airbag housing 20 is made of plastic or metal and has in the upper end thereof the opening 25, through which the cushion 40 inflated by the deployment gas is deployed towards the passenger seat. Furthermore, a mounting flange 27, in which bolt holes 26 are formed, is integrally provided around the rim of the opening 25. The mounting flange 27 is brought into close contact with and is fastened to the rear surface of an instrument panel 65. A circular insert hole 24 for installation of the disk type inflator 30 is formed through the bottom 23 of the airbag housing 20 which is opposite the opening 25.

The inflator 30 has a disk-shaped can structure. The upper half of the inflator 30 is inserted into the airbag housing 20 through the circular insert hole 24. Furthermore, a ring-shaped flange 33, which is brought into contact with the rear surface of the bottom 23 of the airbag housing 20, is provided around the circumferential outer surface of the inflator 30. Bolt holes 35, which correspond to bolt holes formed through the bottom 23 of the airbag housing 20, are formed through the ring-shaped flange 33. A gas discharge hole (not shown), through which deployment gas is discharged, is formed in the upper surface of the inflator 30, which is disposed in the airbag housing 20. A connector (not shown), which connects to an outside sensor, is provided in the lower surface of the inflator 30 which is disposed outside the airbag housing 20.

The retainer 50 is a plate which is placed in the airbag housing 20 to support the cushion 40. A through hole 53, through which the upper half of the inflator 30 passes, is formed at a central position through the retainer 50. Several locking bolts 55, which pass through bolt holes 45 formed in the inlet part 41 of the cushion 40, the bolt holes 35 of the ring-shaped flange 33 of the inflator 30, and the bolt holes 29 of the bottom 23 of the airbag housing 20, are provided under the lower surface of the retainer 50 around the through hole 53.

Figure 10:
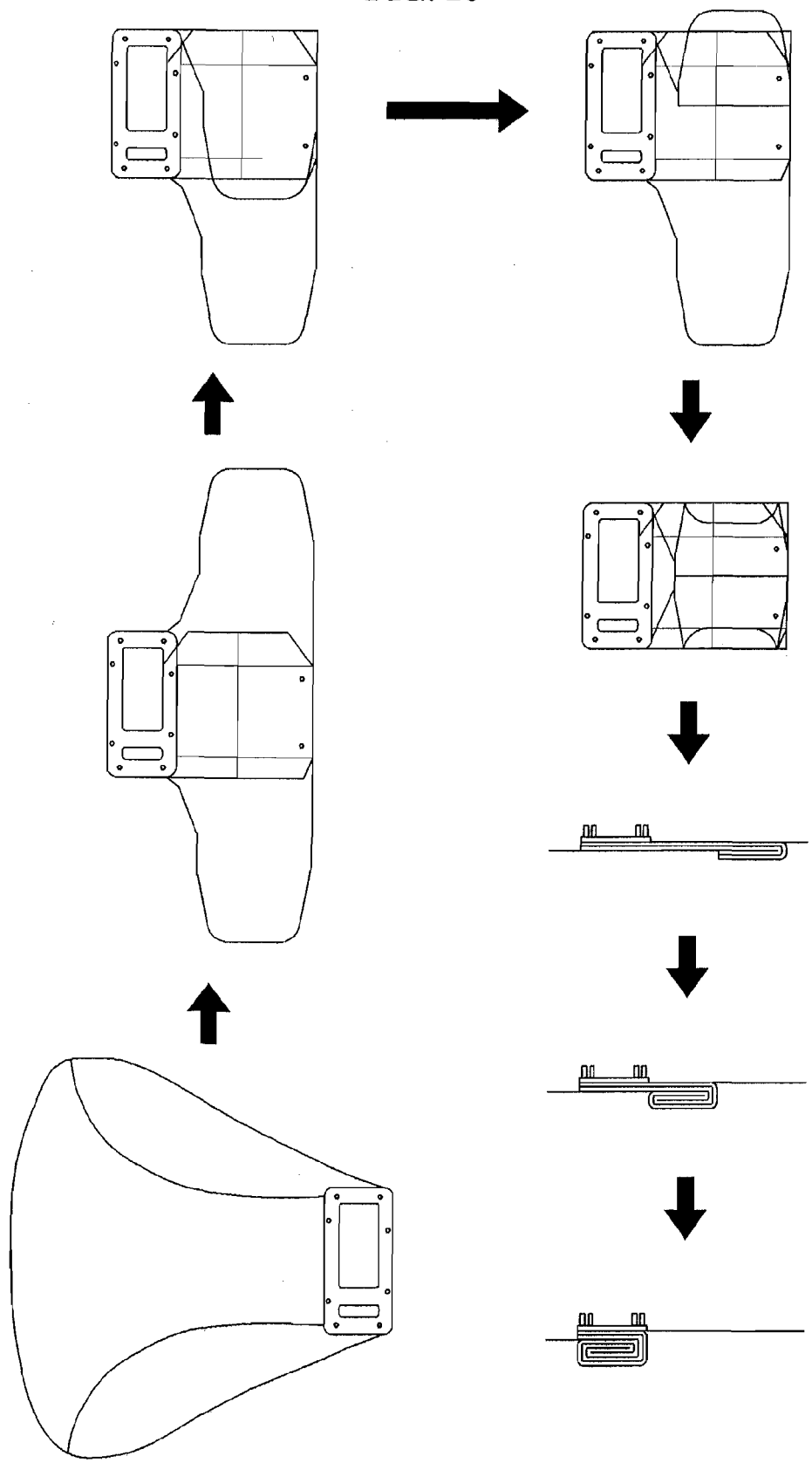
FIG. 10 is a view illustrating the method of folding an airbag cushion used in the slim type passenger airbag module according to the present invention.

Therefore, while the upper half of the inflator 30 is inserted into the receiving space in the airbag housing 20 through the circular insert hole 24, the locking bolts 55 of the retainer 50 are inserted into the bolt holes 45, formed in the inlet part 41 of the cushion 40, the bolt holes 29 of the bottom 23 of the airbag housing 20, and the bolt holes 35 of the flange 33 of the inflator 30, and, thereafter, are tightened into respective locking nuts 56. Thereby, the inlet part 41 of the cushion 40 and the flange 33 of the inflator 30 are reliably fastened to the bottom 23 of the airbag housing 20. Meanwhile, the cushion 40 is folded in one manner selected from among a zigzag 1-tug manner, a zigzag roll manner and a zigzag manner, and is placed in the airbag housing 20. For example, FIG. 10 illustrates a preferred embodiment of the cushion 40 used in the slim type passenger airbag module according to the present invention and, more particularly, illustrates a process of folding the cushion 40 in the zigzag 1-tug manner.

As shown in FIG. 5c, in the slim type passenger airbag module 101 according to the first embodiment of the present invention, the mounting flange 27 of the airbag housing 20 is brought into contact with the rear surface of the instrument panel 65 such that locking bolts 66 provided under the rear surface of the instrument panel 65 are inserted through the respective bolt holes 26 formed in the mounting flange 27, and, thereafter, the locking bolts 66 are tightened into respective locking nuts 67. Furthermore, a bracket (not shown) mounted to the bottom of the airbag housing 20 is fastened to a tie bar (not shown) using coupling means such as nuts and bolts. Meanwhile, a separate housing airbag door (not shown) may be provided in the airbag housing 20. Preferably, an airbag door 69 is integrally provided in the instrument panel 65 without a separate housing airbag door, and a breaking groove 68 is formed in the rear surface of the instrument panel 65 in a shape corresponding to the airbag door 69. Thus, when the vehicle accident occurs, the breaking groove 68 is broken by the expansion force of the cushion 40, and the airbag door 69 is simultaneously opened.

As such, in the slim type passenger airbag module 101 according to the first embodiment of the present invention, the airbag housing 20 is constructed into a single body without being divided into a cushion housing and an inflator housing. Furthermore, unlike the conventional art, which uses a cylindrical inflator, a disk type inflator 30 is used, and the upper half of the disk type inflator 30 is disposed in the airbag housing 20 while the lower half thereof is disposed outside the airbag housing 20. In addition, the retainer 50 is brought into close contact with and is mounted to the bottom 23 of the airbag housing 20, such that the inlet part 41 of the cushion 40 and the flange 33 of the disk type inflator 30 are fastened together to the bottom 23 of the airbag housing 20 by the retainer 50. Therefore, the assembly structure is simplified, and the length of the slim type passenger airbag module 101 is minimized.

Next, a slim type passenger airbag module 102 used in a low risk deployment passenger airbag system according to a second embodiment of the present invention will be described herein below with reference to the attached drawings.

Figure 6A:
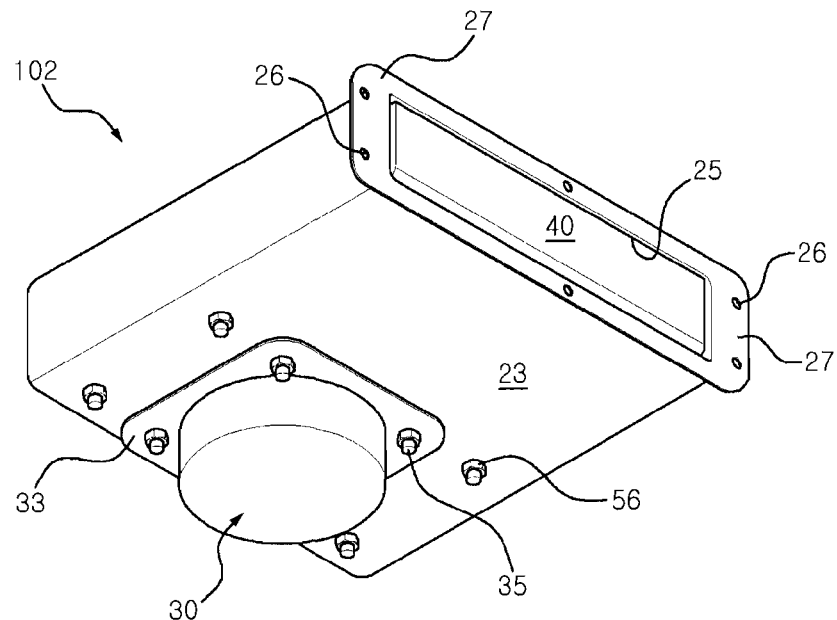
FIGS. 6a and 6b are a perspective and a sectional view showing a slim type passenger airbag module, according to a second embodiment of the present invention.
Figure 6B:
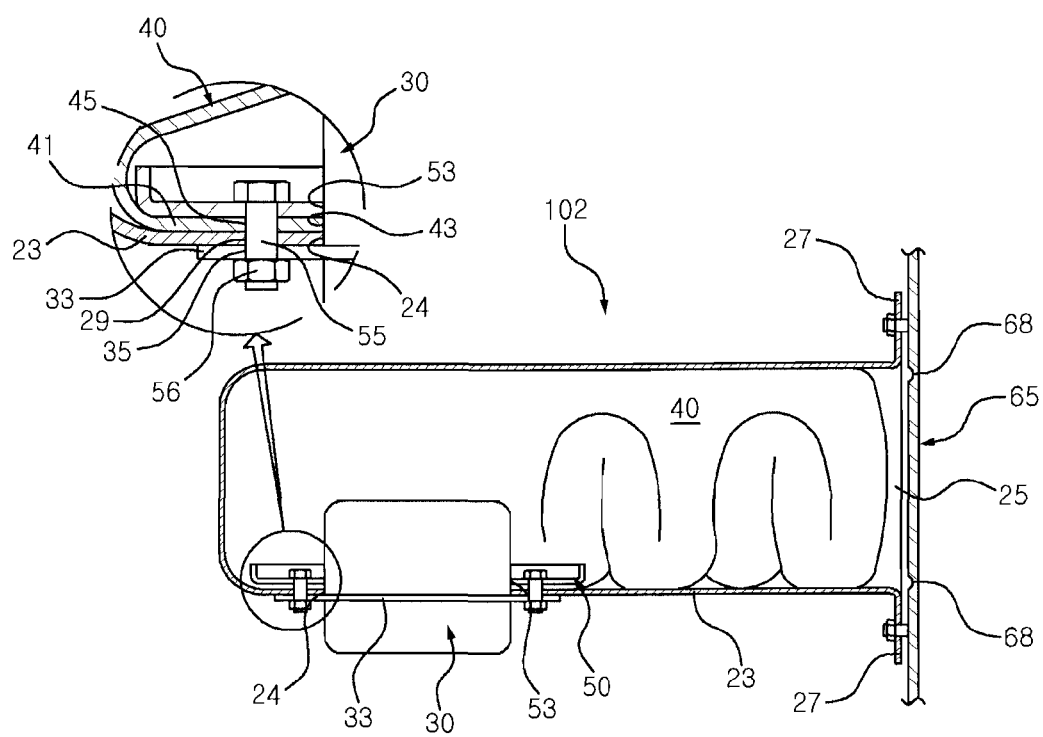

FIGS. 6a and 6b are a perspective view and a sectional view showing the slim type passenger airbag module 102 used in the low risk deployment passenger airbag system, according to the second embodiment of the present invention. As shown in the drawings, the slim type passenger airbag module 102 according to the second embodiment of the present invention includes a box-shaped airbag housing 20, which has an opening 25 in a front end thereof, and a disk type inflator 30, which is mounted to the bottom 23 of the airbag housing 20 and discharges deployment gas. The slim type passenger airbag module 102 further includes a cushion 40 which is inflated through the opening 25 towards a passenger seat by deployment gas discharged from the disk type inflator 30, and a retainer 50, which fastens an inlet part 41 (see, FIG. 6b) of the cushion 40 and the disk type inflator 30 to the bottom 23 of the airbag housing 20. That is, the slim type passenger airbag module 102 according to the second embodiment is constructed such that the opening 25 formed in the front end of the airbag housing 20 is perpendicular to the upper surface of the disk type inflator 30 provided through the bottom 23 of the airbag housing 20, thus minimizing the height of the slim type passenger airbag module 102.

In detail, the box-shaped airbag housing 20 is made of plastic or metal, and has in the front end thereof the opening 25, through which the cushion 40 inflated by the deployment gas is deployed towards the passenger seat. Furthermore, a mounting flange 27, in which bolt holes 26 are formed, is integrally provided around the rim of the opening 25. The mounting flange 27 is brought into close contact with and is fastened to the rear surface of an instrument panel 65. A circular insert hole 24 for installation of the disk type inflator 30 is formed through the bottom 23 of the airbag housing 20.

The inflator 30 has a disk-shaped can structure. The upper half of the inflator 30 is inserted into the airbag housing 20 through the circular insert hole 24. A ring-shaped flange 33, which is brought into contact with the bottom 23 of the airbag housing 20, is provided around the circumferential outer surface of the inflator 30. Bolt holes 35, which correspond to bolt holes formed through the bottom 23 of the airbag housing 20, are formed through the ring-shaped flange 33.

The retainer 50 is a plate which is placed in the airbag housing 20 and supports the cushion 40. A through hole 53, through which the upper half of the inflator 30 passes, is formed at a central position through the retainer 50. Several locking bolts 55, which pass through bolt holes 45 formed in the inlet part 41 of the cushion 40 and the bolt holes 35 of the ring-shaped flange 33 of the inflator 30, are provided in the retainer 50 around the through hole 53.

Therefore, as shown in FIG. 6b, in the state in which the upper half of the inflator 30 is inserted into the receiving space in the airbag housing 20 through the circular insert hole 24, the locking bolts 55 of the retainer 50 are inserted into the bolt holes 45 of the inlet part 41 of the cushion 40, the bolt holes 29 of the bottom 23 of the airbag housing 20, and the bolt holes 35 of the flange 33 of the inflator 30, and, thereafter, are tightened into respective locking nuts 56. Thereby, the inlet part 41 of the cushion 40 and the flange 33 of the inflator 30 are reliably fastened to the bottom 23 of the airbag housing 20.

As such, in the slim type airbag module 102 according to the second embodiment, the opening 25 is formed in the front end of the airbag housing 20, and the disk type inflator 30 is mounted to the bottom 23 of the airbag housing 20 such that it is perpendicular to the opening 25. Therefore, the height of the slim type airbag module 102 can be minimized independently of the size of the disk type inflator 30.

Figure 7A:
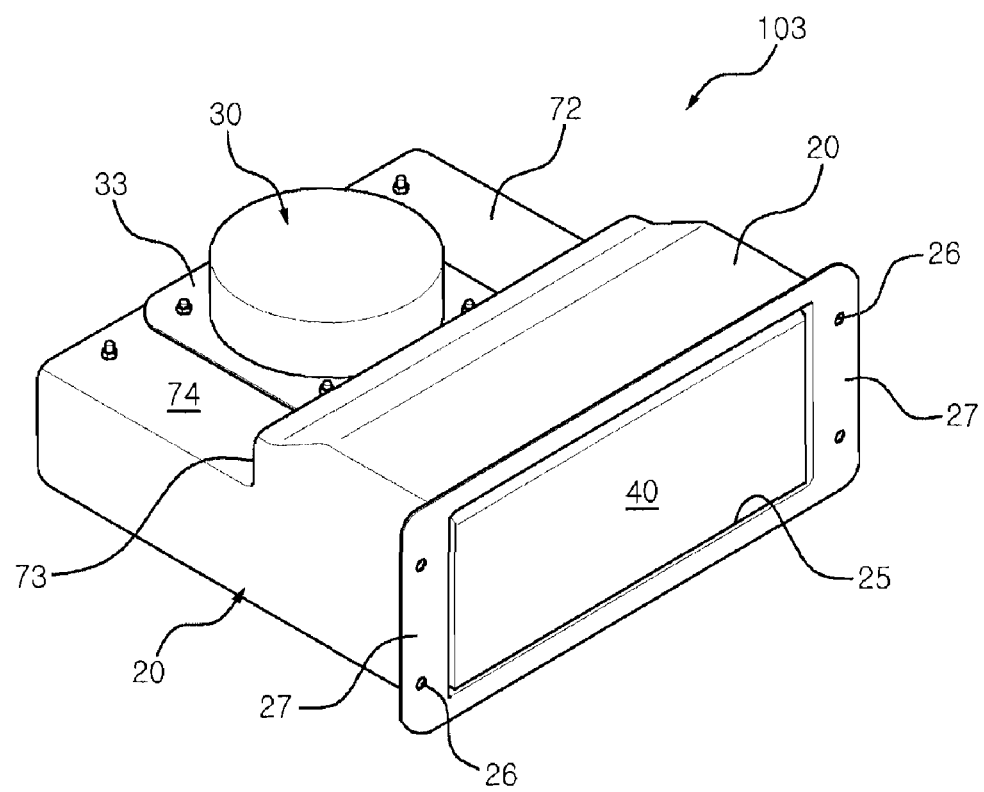
FIGS. 7a and 7b are a perspective and an exploded perspective view showing a slim type passenger airbag module, according to a third embodiment of the present invention.
Figure 7B:
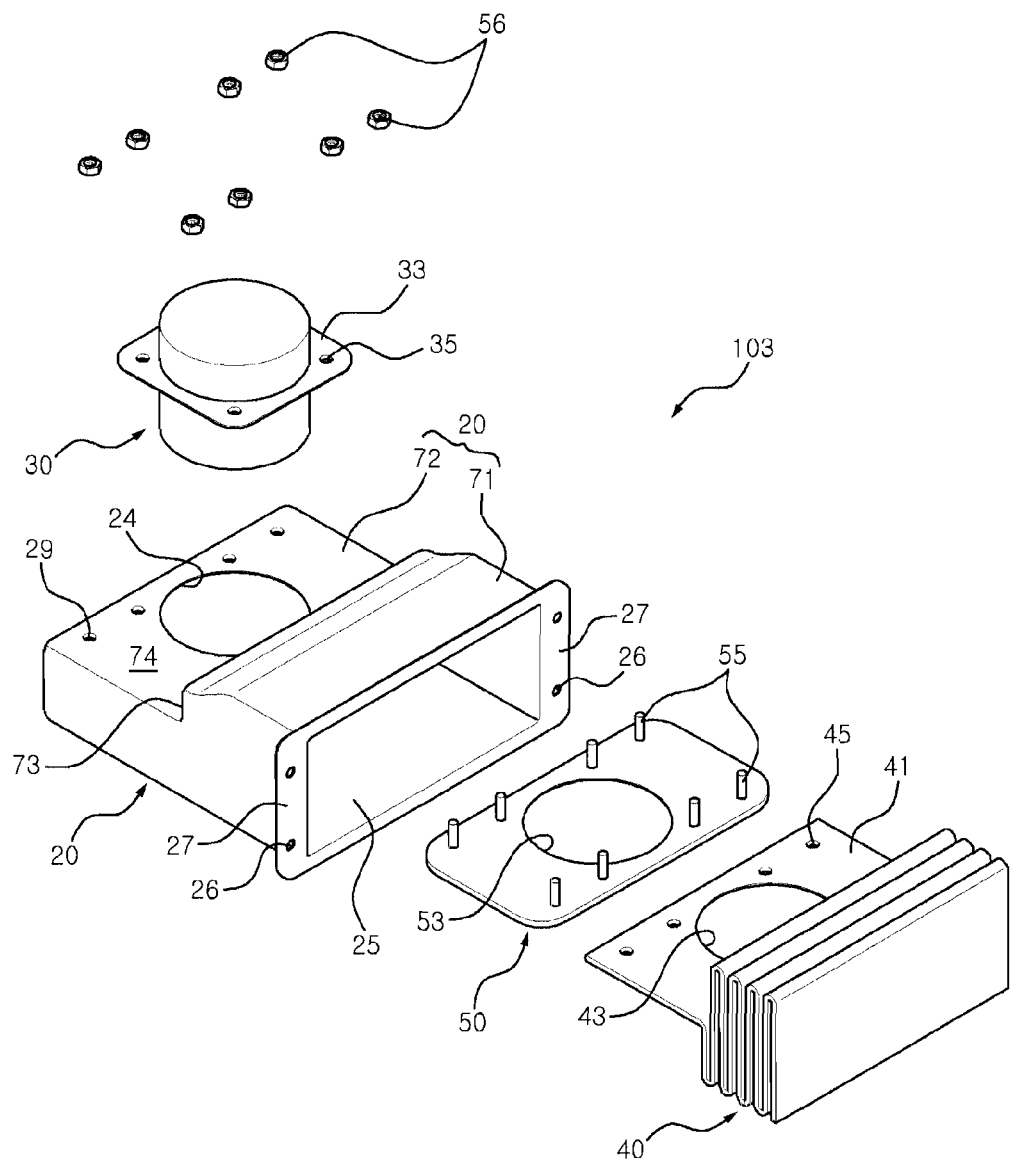

Hereinafter, a slim type passenger airbag module 103 according to a third embodiment of the present invention will be described herein below with reference to FIGS. 7*a* and 7*b*. FIG. 7*a* is a perspective view of the slim type passenger airbag module 103 according to the third embodiment, and FIG. 7*b* is an exploded perspective view of the slim type passenger airbag module 103.

As shown in the drawings, an inflator 30, a cushion 40 and a retainer 40 of the slim type passenger airbag module 103 according to the third embodiment of the present invention are the same as those of the slim type passenger airbag module 102 according to the second embodiment, but the front part of the airbag housing 20, in which the opening 25 is formed, that is, a cushion receiving part 71, is higher than in the slim type passenger airbag module 102 according to the second embodiment, such that a cushion 40 having a larger volume can be placed therein. As such, in the slim type passenger airbag module 103 according to the third embodiment, the rear part of the airbag housing 20, that is, an inflator receiving part 72, has a height different from that of the cushion receiving part 71, so that a stepped part 73 having a predetermined height is formed therebetween.

In detail, the slim type passenger airbag module 103 according to the third embodiment includes the box-shaped airbag housing 20, which has an opening 25 in a front end thereof and has the stepped part 73 at an intermediate position thereof so that the cushion receiving part 71, in which the cushion 40 is placed, is higher than the other part of the airbag housing 20. The slim type passenger airbag module 103 further includes the disk type inflator 30, which is mounted to the upper surface 23 of the inflator receiving part 74 of the airbag housing 20 and discharges deployment gas, the cushion 40 to be inflated through the opening 25 towards a passenger seat by deployment gas discharged from the disk type inflator 30, and the retainer 50, which fastens the inlet part 41 (see, FIG. 7*b*) of the cushion 40 and a ring-shaped flange 33 of the disk type inflator 30 to the upper surface 74 of the inflator receiving part 72 of the airbag housing 20. The general construction of the slim type passenger airbag module 103, other than the above structure, remains the same as the above-mentioned embodiments, therefore further explanation is deemed unnecessary.

As such, the slim type passenger airbag module 103 according to the third embodiment is constructed such that the cushion receiving part 71 is higher than the inflator receiving part 72 and thus can receive a cushion 40 having a larger volume therein but maintains the height of the rear part of the airbag housing 20 at a minimum, thus ensuring sufficient space for installation of two passenger airbag modules in a single instrument panel 65.

Figure 8A:
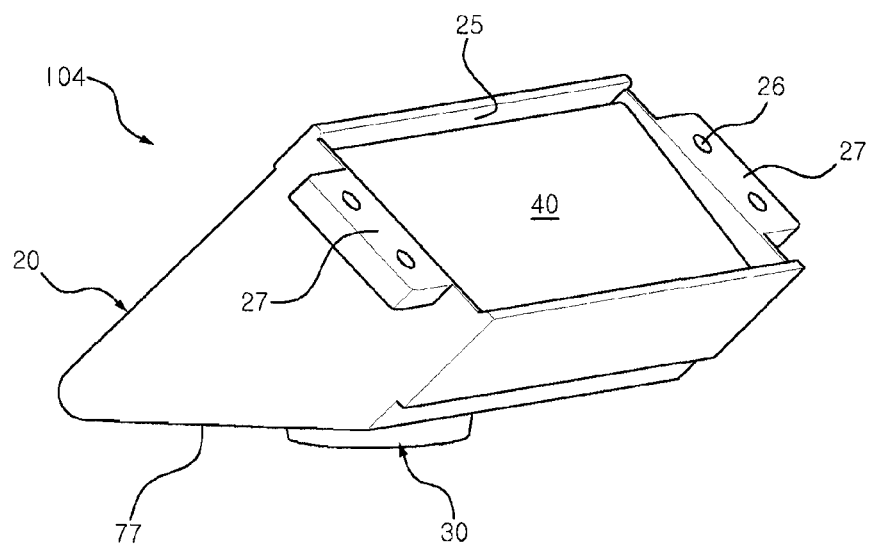
FIGS. 8a and 8b are a perspective and a sectional view showing a slim type passenger airbag module, according to a fourth embodiment of the present invention.
Figure 8B:
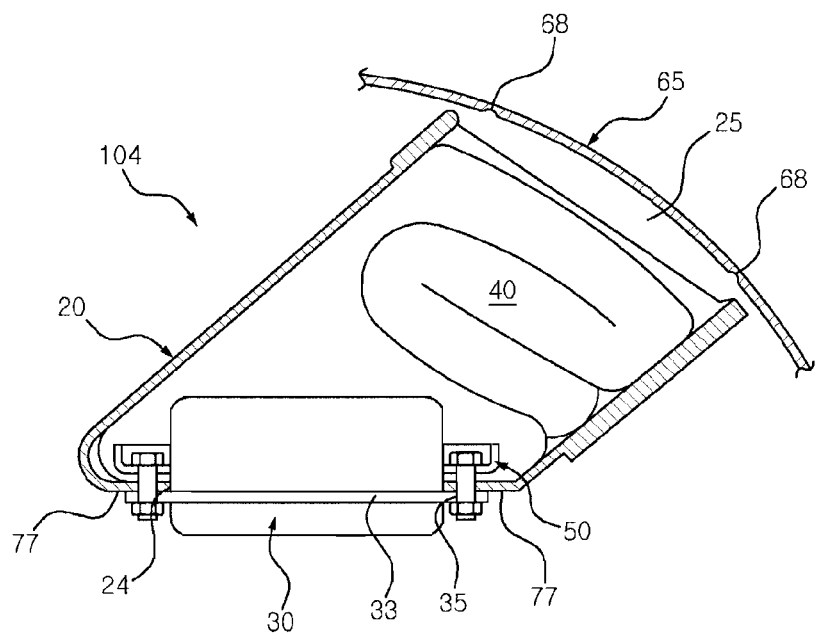

FIGS. 8*a* and 8*b* are a perspective view and a sectional view showing a slim type passenger airbag module 104, according to a fourth embodiment of the present invention.

As shown in the drawings, the slim type passenger airbag module 104 according to the fourth embodiment of the present invention includes a box-shaped airbag housing 20, which has an opening 25 in a front end thereof and has an inclined surface 77, which is inclined at a predetermined angle, on the surface opposite the opening 25. The slim type passenger airbag module 104 further includes a disk type inflator 30, which is mounted to the inclined surface 77 of the airbag housing 20 and discharges deployment gas, a cushion 40 to be inflated through the opening 25 towards a passenger seat by deployment gas discharged from the disk type inflator 30, and a retainer 50, which fastens an inlet part 41 (see, FIG. 6*b*) of the cushion 40 and the disk type inflator 30 to the inclined surface 77 of the airbag housing 20.

In detail, the box-shaped airbag housing 20 is made of plastic or metal and has in the front end thereof the opening 25, through which the cushion 40 inflated by the deployment gas is deployed towards the passenger seat. The inclined surface 77 is formed opposite the opening 25. Furthermore, a mounting flange 27, in which bolt holes 26 are formed, is integrally provided around the rim of the opening 25. The mounting flange 27 is fastened to the rear surface of an instrument panel 65, thus mounting the slim type passenger airbag module to the instrument panel 65. A circular insert hole 24 for installation the disk type inflator 30 is formed through the inclined surface 77 of the airbag housing 20 which is opposite the opening 25.

The inflator 30 has a disk-shaped can structure. The upper half of the inflator 30 is inserted into the airbag housing 20 through the circular insert hole 24. A ring-shaped flange 33, which is brought into contact with the inclined surface 77 of the airbag housing 20, is provided around the circumferential outer surface of the inflator 30. Bolt holes 35, which correspond to bolt holes formed through the inclined surface 77 of the airbag housing 20, are formed through the ring-shaped flange 33. The general construction of the slim type passenger airbag module 104, other than the structures noted above, remains the same as the previous embodiment, therefore further explanation is deemed unnecessary.

Figure 9A:
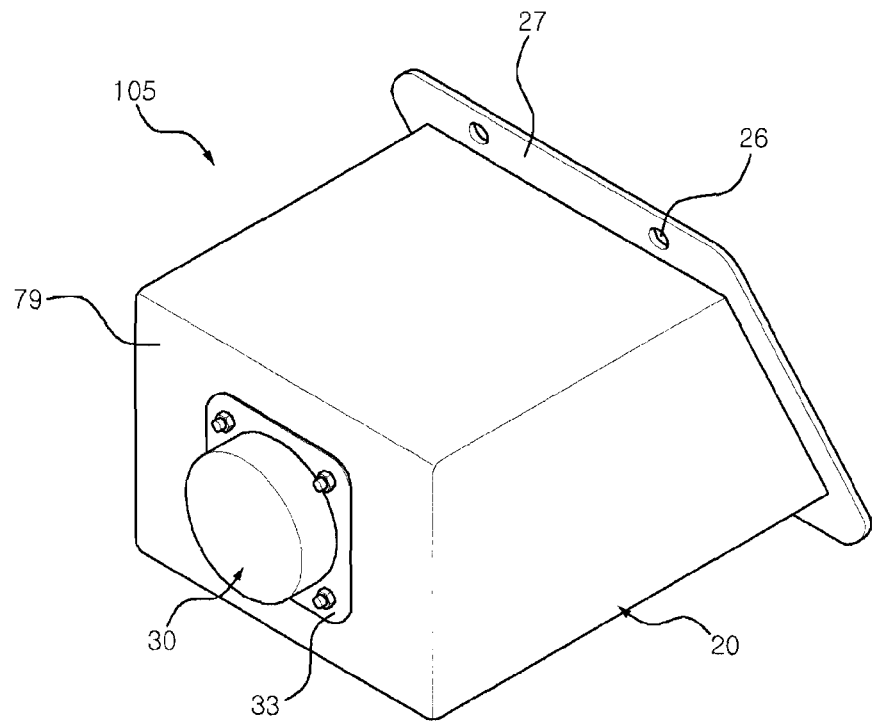
FIGS. 9a and 9b are a perspective and a sectional view showing a slim type passenger airbag module, according to a fifth embodiment of the present invention.
Figure 9B:
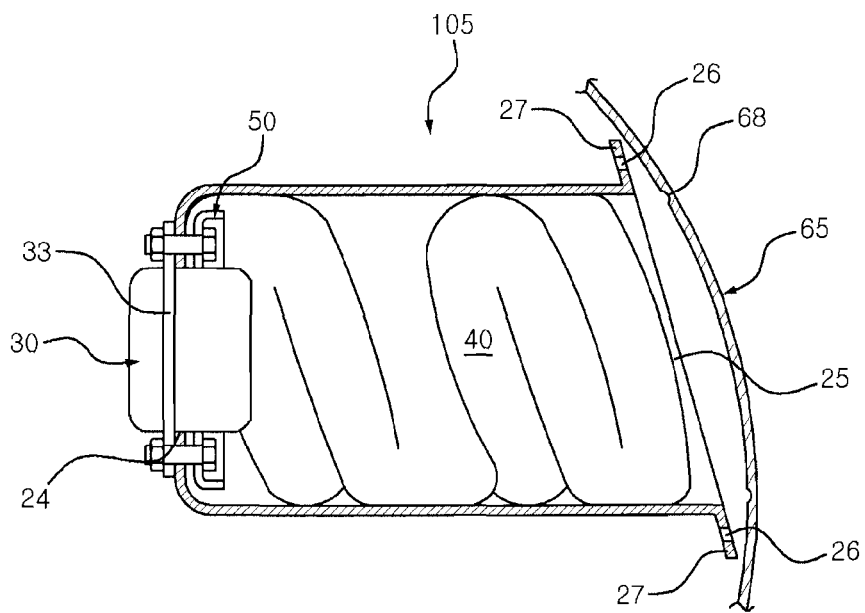

FIGS. 9*a* and 9*b* are a perspective view and a sectional view showing a slim type passenger airbag module 105, according to a fifth embodiment of the present invention.

As shown in the drawings, the slim type passenger airbag module 105 according to the fifth embodiment of the present invention includes a box-shaped airbag housing 20, which has therein an opening 25 formed at an incline, and a disk type inflator 30, which is mounted to a rear surface 79 of the airbag housing 20 and discharges deployment gas. The slim type passenger airbag module 105 further includes a cushion 40 that is inflated through the opening 25 towards a passenger seat by deployment gas discharged from the disk type inflator 30, and a retainer 50, which fastens an inlet part 41 (see, FIG. 6*b*) of the cushion 40 and the disk type inflator 30 to the rear surface 79 of the airbag housing 20.

In this embodiment, the box-shaped airbag housing 20 is made of plastic or metal and has in the front end thereof the opening 25, which is inclined at a predetermined angle, and through which the cushion 40 inflated by the deployment gas is deployed. Furthermore, a mounting flange 27, in which bolt holes 26 are formed, is integrally provided around the rim of the opening 25. Here, the inclination angle of the opening 25 corresponds to the curvature of an instrument panel 65. A circular insert hole 24 for installation of the disk type inflator 30 is formed through the rear surface 97 of the airbag housing 20. The general construction of the slim type passenger airbag module 105 other than the structures noted above remains the same as the previous embodiment. The slim type passenger airbag module 105 according to the fifth embodiment can be appropriately applied to an instrument panel 65 which is inclined at a predetermined angle and has a curved surface. In addition, the slim type passenger airbag module 101, 102, 103, 104 of each embodiment of the present invention can also have the same effect by forming the surface defining the opening 25 at an incline or in a curved shape.

As described above, the slim type passenger airbag module of the present invention has the disk type inflator, unlike the conventional art having the cylindrical inflator, and is constructed such that the inflator and the opening face each other, are perpendicular to each other, or are angled with respect to each other in order to minimize the height and/or length of the airbag module, and such that the height of the rear part of the airbag housing is relatively low, thus ensuring sufficient space to install two passenger airbag modules to the rear surface of, or underneath, a single instrument panel.

Hereinafter, a preferred embodiment of a low risk deployment passenger airbag system using a slim type passenger airbag module according to the present invention will be described in detail with reference to the attached drawings.

Figure 1A:
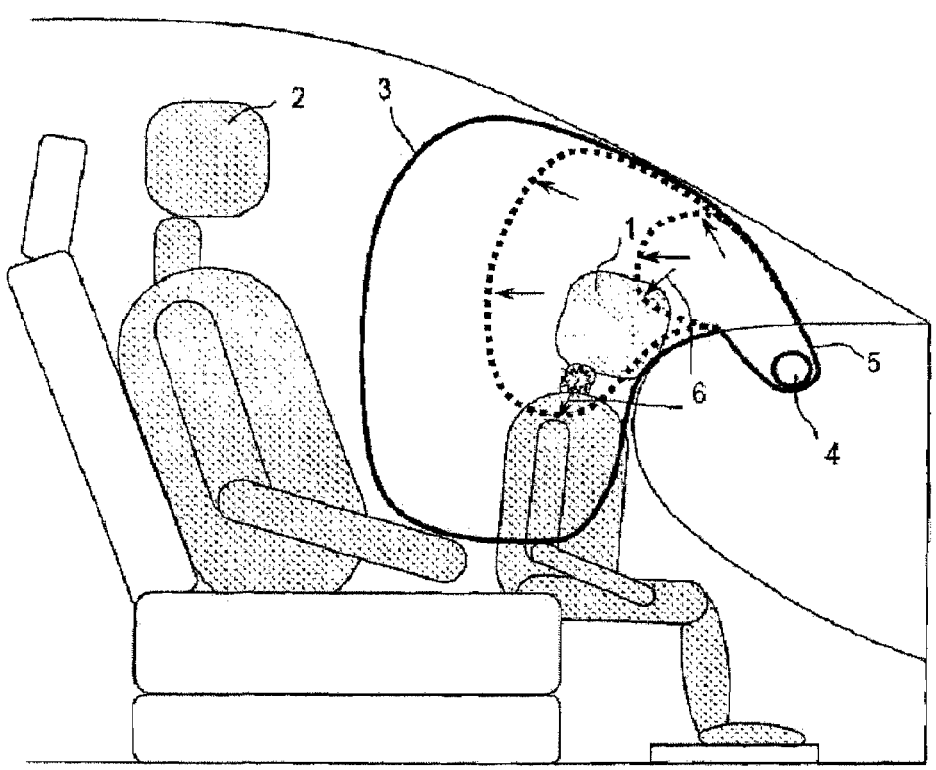
FIGS. 1a and 1b are side views showing conventional passenger airbag systems.
Figure 1B:
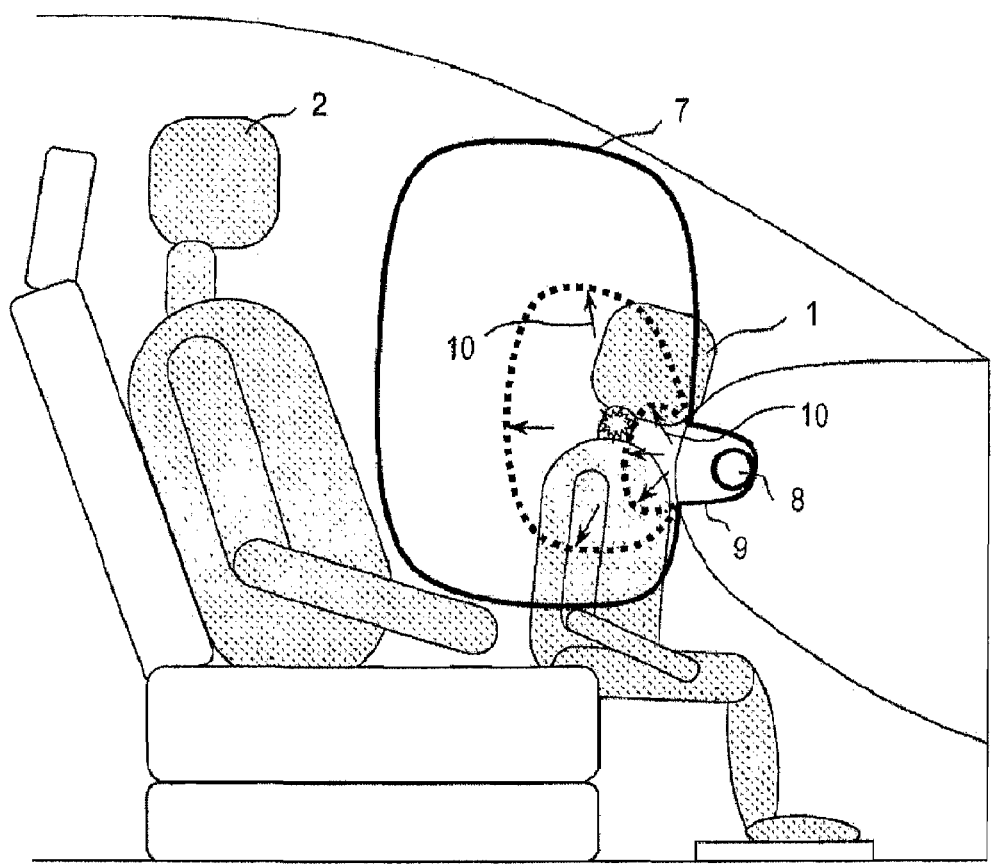
Figure 2:
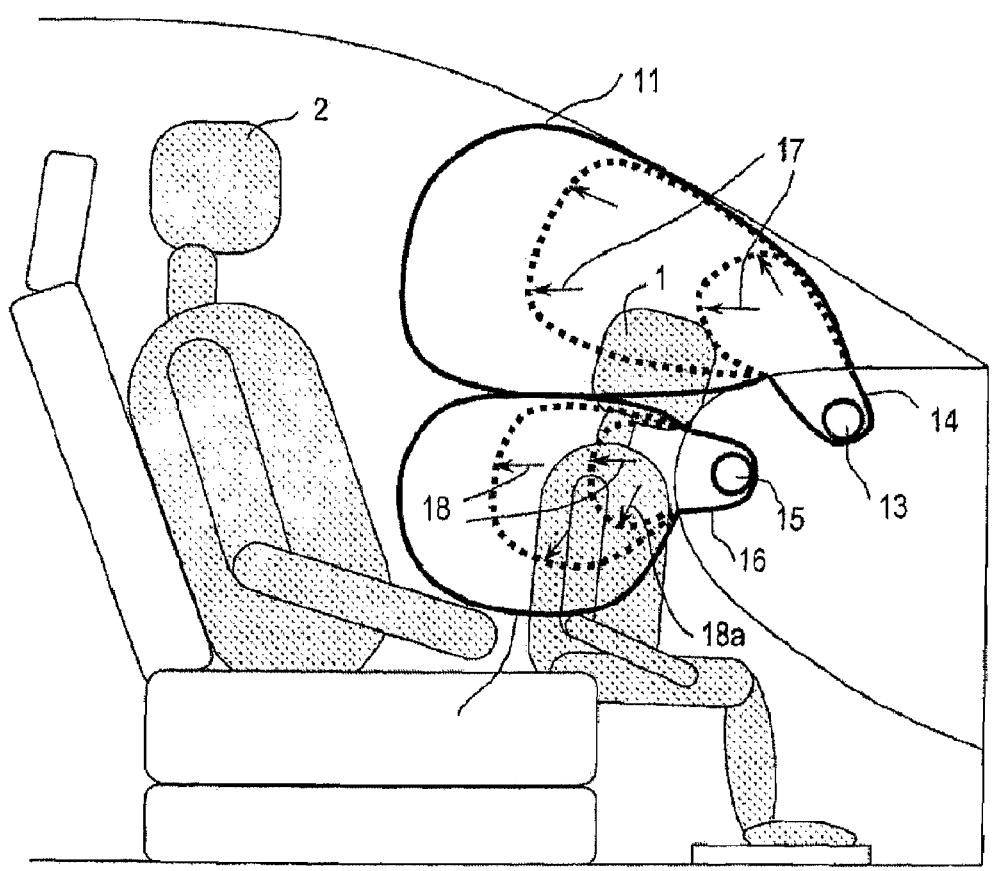
FIG. 2 is a side view showing a conventional low risk deployment passenger airbag system.
Figure 3A:
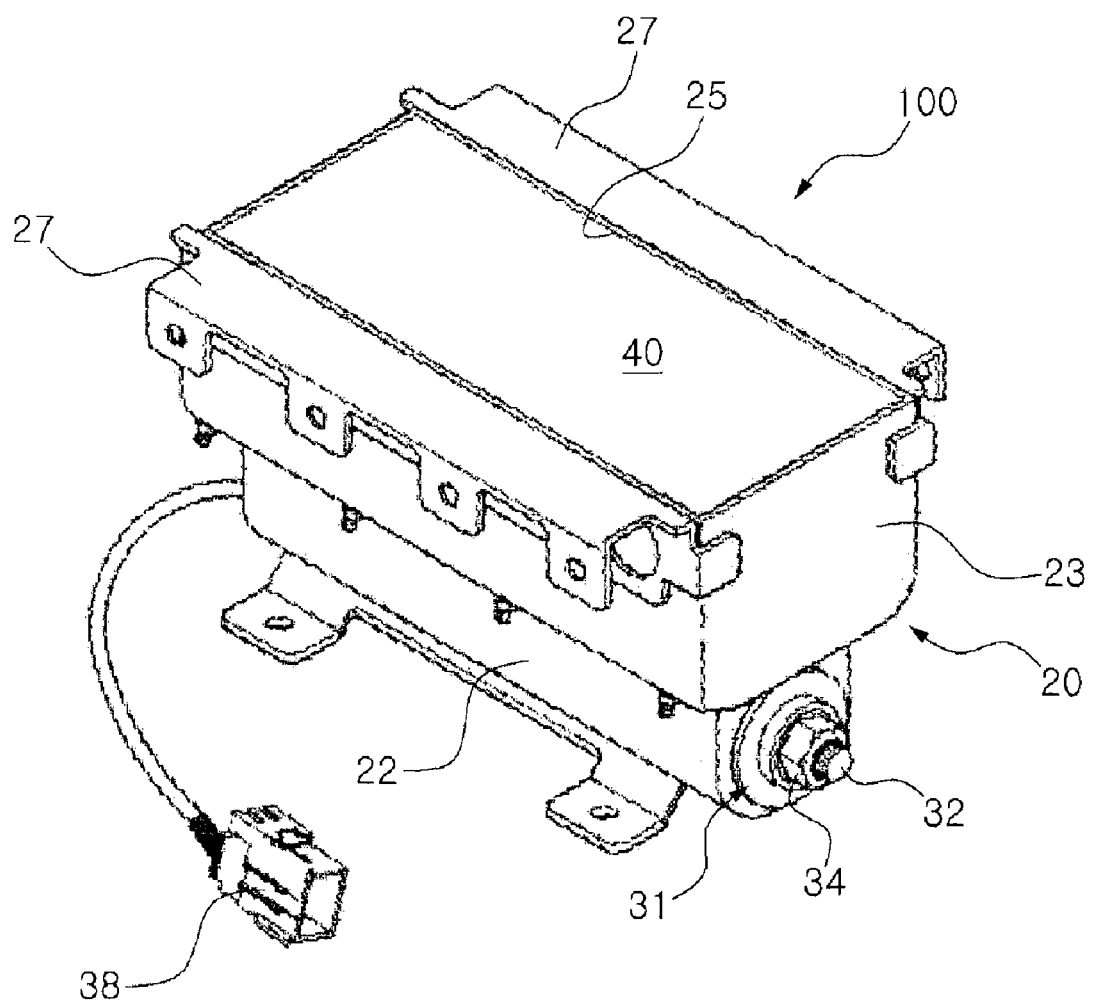
FIGS. 3a and 3b respectively are a perspective view and a sectional view showing an example of a passenger airbag module according to a conventional technique.
Figure 3B:
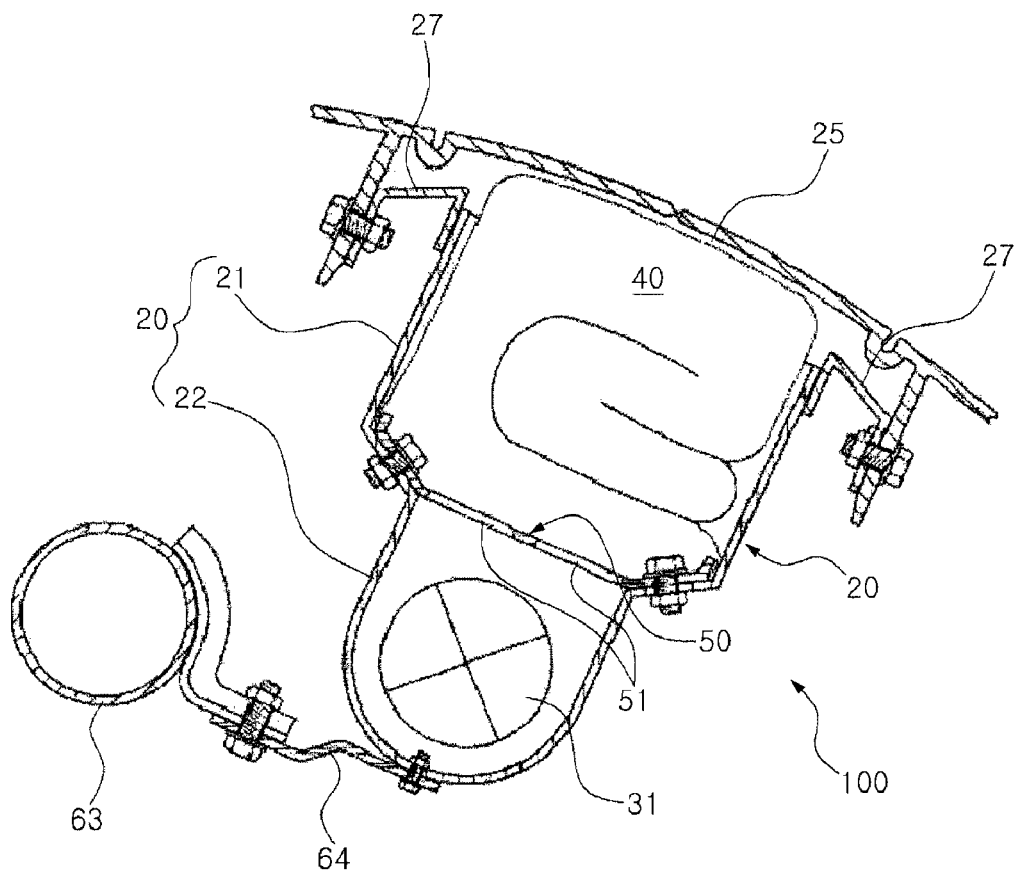

As shown in FIG. 2, in the low risk deployment passenger airbag system of the present invention, when a vehicle crash occurs, because the cushion of a top airbag T and the cushion of a mid airbag M are horizontally deployed towards a passenger seat in conjunction with each other, an impact applied by airbag inflation to an out-of position occupant, for example, a child, can be reduced.

Figure 4:
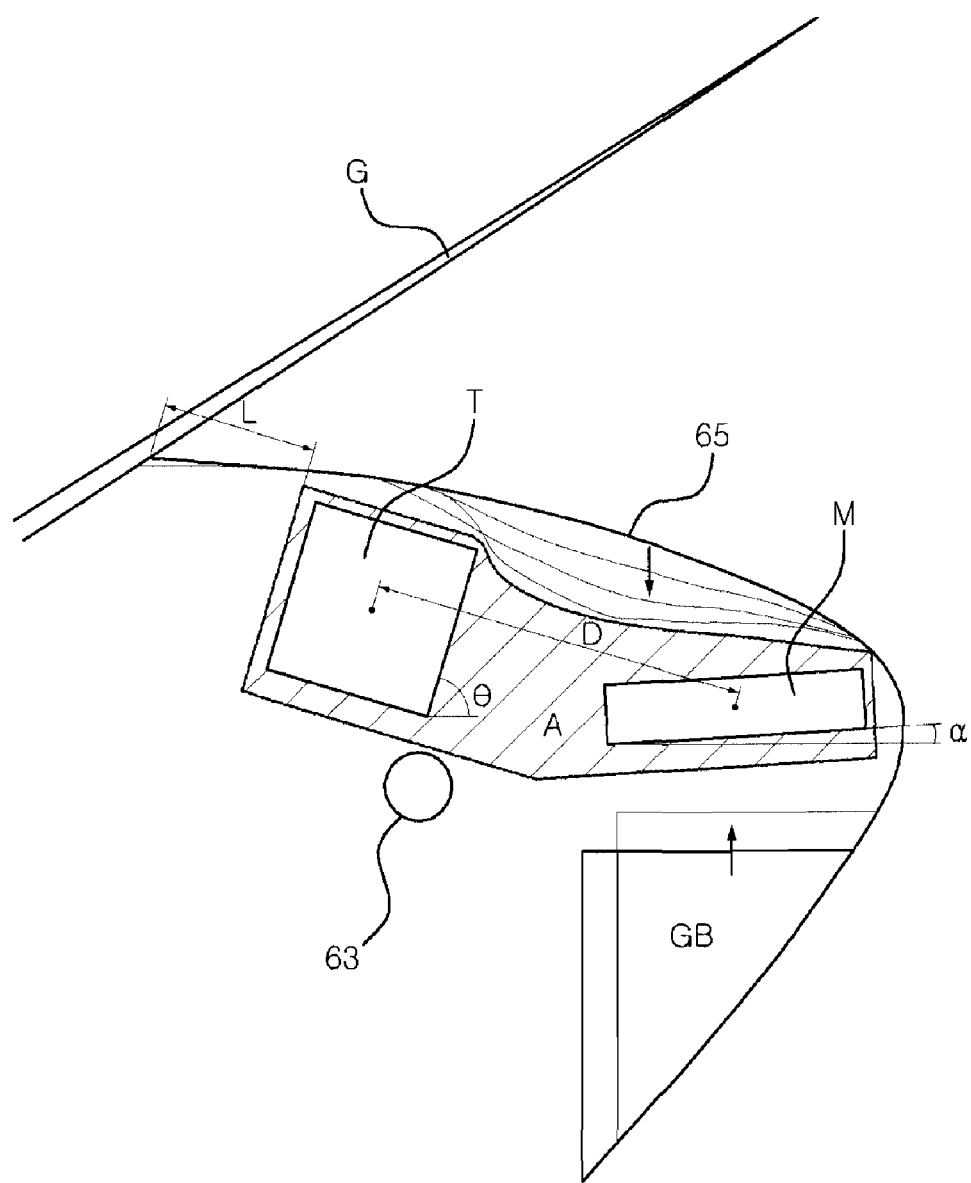
FIG. 4 is a schematic sectional view of an instrument panel illustrating an area for installing a top airbag and a mid airbag according to the conventional technique.

Therefore, to achieve the intended function of the low risk deployment passenger airbag system, as shown in FIG. 4, the distance (D) between the centers of the top airbag T and the mid airbag M must be appropriately set. In detail, the distance (D) between the centers of the top airbag T and the mid airbag M must be defined within an appropriate range such that two deploying cushions graze and contact each other. If the distance (D) between the centers of the top airbag T and the mid airbag M is excessively great, the two cushions cannot be operated in conjunction with each other. Conversely, if the distance (D) therebetween is excessively short, because the two cushions strongly bump against each other and rebound away from each other, they cannot be horizontally deployed.

Furthermore, the top airbag T and the mid airbag M must be installed such that they are angled towards each other within a predetermined angular range. If the angle between the top airbag T and the mid airbag M is too large, the two cushions cannot contact each other when being deployed. Conversely, if the angle between the top airbag T and the mid airbag M is too small, because the two cushions strongly bump against each other and rebound away from each other, they cannot be horizontally deployed.

Meanwhile, in the low risk deployment passenger airbag system, the volume of the cushion of the top airbag T is greater than that of the cushion of the mid airbag M. The reason for this is that the top airbag T is disposed at a position relatively far from the occupant. Preferably, the ratio of the volume of the cushion of the top airbag T to the cushion of the mid airbag M is 2:1. In the preferred embodiment of the low risk deployment passenger airbag system according to the present invention, the cushion of the top airbag T has a volume ranging from 60 L to 120 L, and the cushion of the mid airbag M has a volume ranging from 30 L to 70 L. Under the above conditions, it is preferable that the distance (D) between the centers of the top airbag T and the mid airbag M be within a range from 100 mm to 250 mm.

Furthermore, the inclination angle ($\theta$) of the top airbag T with respect to a horizontal surface ranges from 60° to 75°, and an inclination angle ($\alpha$) of the mid airbag M with respect to the horizontal surface ranges from 0° to 15°. That is, it is preferable that the angle between the top airbag T and the mid airbag M be approximately 60°.

Meanwhile, preferably, the operating pressure of the inflator used in the top airbag T ranges from 200 kpa to 260 kpa in the case where the volume thereof is 60 L, and the operating pressure of an inflator used in the mid airbag M ranges from 100 kpa to 130 kpa in the case where the volume thereof is 60 L.

Hereinafter, various embodiments of a low risk deployment passenger airbag system using a slim type passenger airbag module will be explained with reference to FIGS. 11a through 11e.

To satisfy the above-mentioned conditions, such as the limited space A, the distance (D) between the top airbag T and the mid airbag M and the inclination angles ($\alpha$) and ($\theta$), at least one of the top airbag module and the mid airbag module which are installed in the instrument panel must use a slim type passenger airbag module.

Figure 11A:
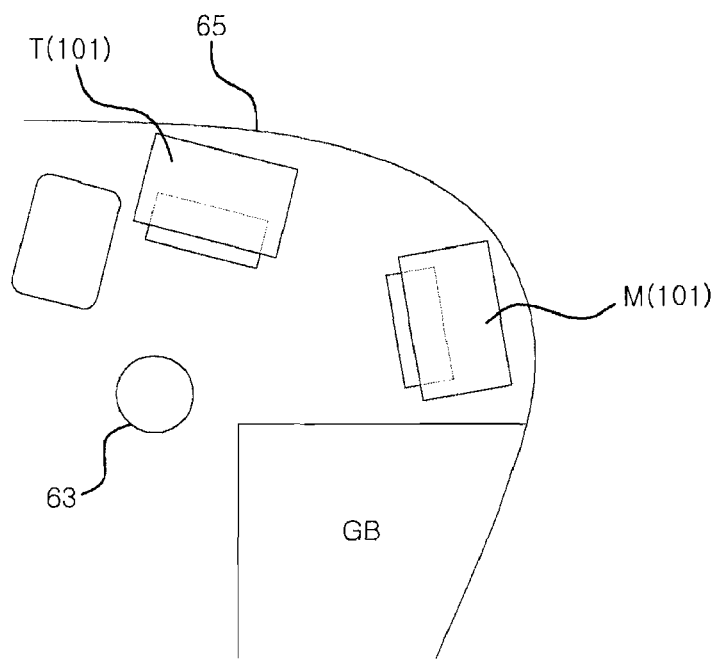
FIGS. 11a-11e are schematic views showing the low risk deployment passenger airbag systems using the slim type airbag modules according to the present invention.
Figure 11B:
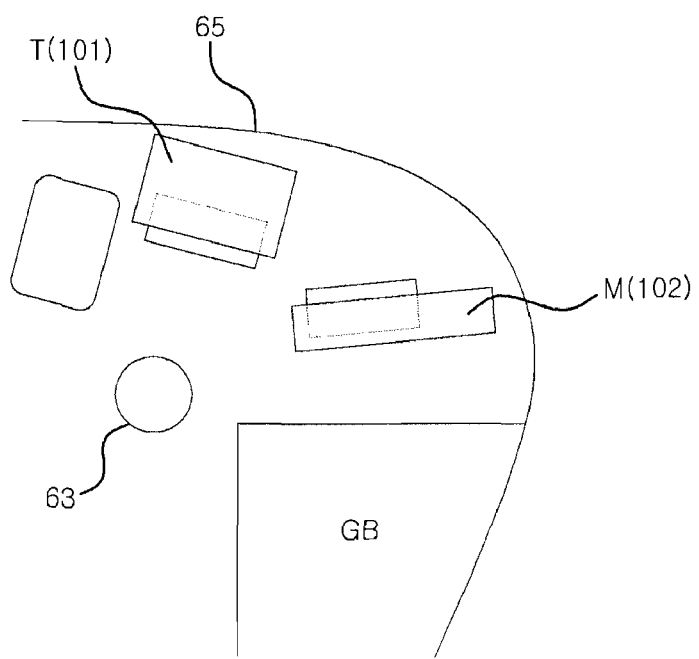
Figure 11C:
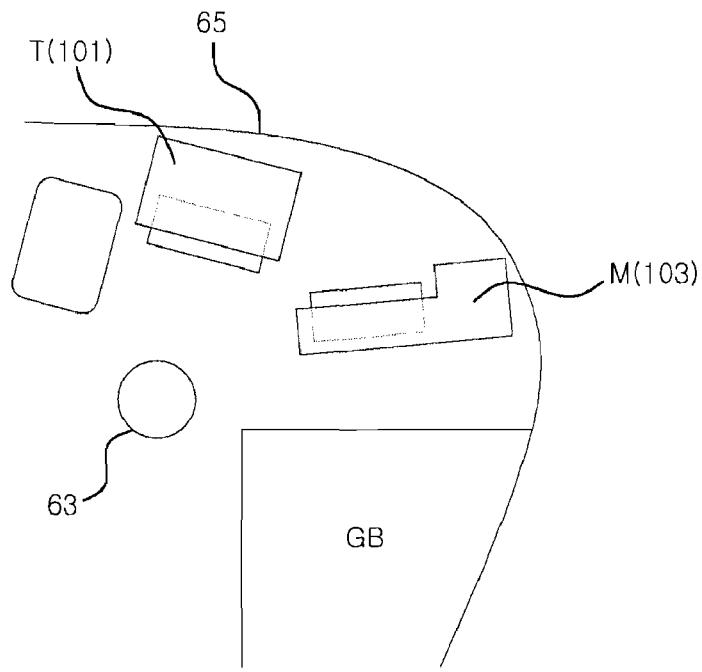

FIG. 11a shows the case where the slim type passenger airbag modules 101 according to the first embodiment are used in both the top airbag T and the mid airbag M. FIG. 11b shows the case where the height of the front surface of the instrument panel is relatively low, so that the slim type passenger airbag module 101 according to the first embodiment is used for the top airbag T, and the slim type passenger airbag module 102 according to the second embodiment is used for the mid airbag M. FIG. 11c shows the case where the height of the front surface of the instrument panel is sufficient but the distance between the mid airbag M and the top airbag T is relatively short. In this case, the slim type passenger airbag module 101 according to the first embodiment is used in the top airbag T, and the slim type passenger airbag module 103 according to the third embodiment is used in the mid airbag M. That is, in the case of the slim type passenger airbag module 103 according to the third embodiment, because the height of the rear part is relatively low, space for installation of the top airbag T is ensured.

Figure 11D:
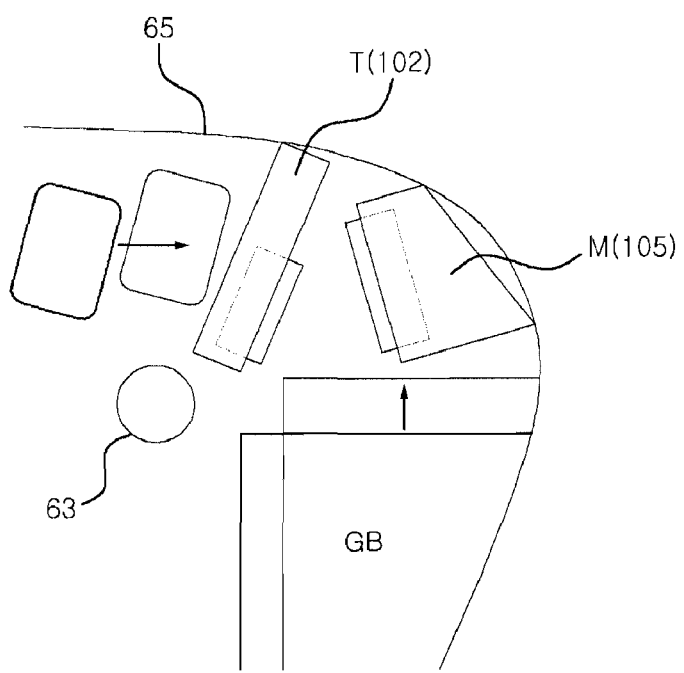
Figure 11E:
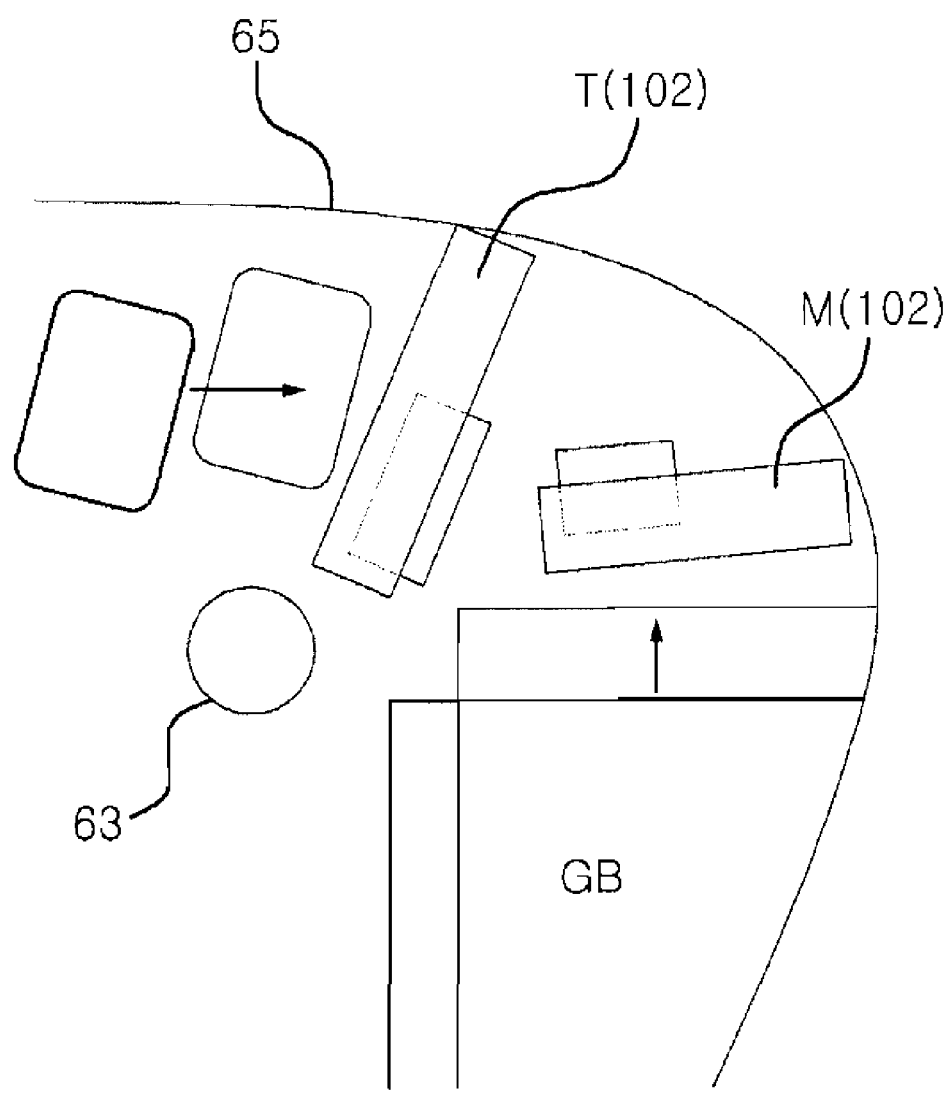

FIG. 11d shows the case where the front surface of the instrument panel is curved, and thus the slim type passenger airbag module 105 according to the fifth embodiment is used. In the slim type passenger airbag module 105 according to the fifth embodiment, the surface defining the opening is inclined, thus facilitating the coupling of the airbag module to the curved surface of the instrument panel. FIG. 11e shows the case where the distance between the mid airbag M and the top airbag T is relatively short and the height of the front surface of the instrument panel is relatively low. In this case, the slim type passenger airbag modules 102 according to the second embodiment are used for both the top airbag T and the mid airbag M.

As such, the low risk deployment airbag system according to the present invention can be implemented using various combinations of the slim type passenger airbag modules depending on conditions such as the limited space A, the distance (D) between the top airbag T and the mid airbag M and the inclination angles ($\alpha$) and ($\theta$).

Although the preferred embodiments of the present invention have been disclosed for illustrative purposes, the scope of the present invention is not limited to the above embodiments. Furthermore, those skilled in the art will appreciate that various modifications, additions and substitutions are possible, without departing from the scope and spirit of the invention as disclosed in the accompanying claims. Therefore, the scope of the present invention must be defined by the accompanying claims.

As described above, the prevent invention provides various kinds of slim type passenger airbag modules such that a top airbag module and a mid airbag module can be installed in a limited space. Because the slim type passenger airbag module of the present invention is relatively low in height and relatively short in length and it can be manufactured into various types, the present invention makes it possible for two passenger airbags to be installed in a limited space.

In a low risk deployment passenger airbag system using the slim type passenger airbag module according to the present invention, when cushions of a top airbag and a mid airbag, which are respectively provided on an upper surface and a front surface of an instrument panel, are deployed in an accident, because the cushions are operated in conjunction with each other, they are deployed substantially horizontally, thus preventing an out-of position child or a small adult from being injured by airbag inflation.

Therefore, the low risk deployment passenger airbag system using the slim type passenger airbag module according to the present invention can meet the low risk deployment criteria for passenger airbags set by the National Highway Traffic Safety Administration (NHTSA).

What is claimed is:

1. A low risk deployment passenger airbag system having passenger airbag modules respectively mounted to an upper surface and a front surface of an instrument panel, wherein at least one of the passenger airbag modules comprises a slim type passenger airbag module, comprising:
    a box-shaped airbag housing, having an opening in a front end thereof, and a flange provided around the opening of the box-shaped airbag housing;
    a disk type inflator, an upper end of which is inserted into the airbag housing through a circular insert hole formed through a bottom of the airbag housing, which is perpendicular to the opening;
    a cushion stored in the airbag housing in a folded state such that the cushion is deployed towards a passenger seat through the opening by deployment gas discharged from the disk type inflator; and
    a retainer fastening both an inlet part of the cushion and a ring-shaped flange, provided around a circumferential outer surface of the disk type inflator, to the bottom of the airbag housing using a locking bolt, the retainer having a circular through hole, through which the upper end of the disk type inflator passes.

2. The low risk deployment passenger airbag system using the slim type passenger airbag module as set forth in claim 1, wherein a front part of the airbag housing, in which the opening is formed, is higher than a rear part of the airbag housing in which the disk type inflator is provided, so that a stepped part having a predetermined height is defined between the front part and the rear part of the airbag housing.

3. The low risk deployment passenger airbag system using the slim type passenger airbag module as set forth in claim 2, wherein a distance between centers of the two passenger airbag modules, which are respectively mounted to the upper surface and the front surface of the instrument panel, is within a range from 100 mm to 250 mm, such that, when a vehicle crash occurs, two cushions of the passenger airbag modules are horizontally deployed towards the passenger seat in conjunction with each other.

4. The low risk deployment passenger airbag system using the slim type passenger airbag module as set forth in claim 3, wherein the airbag module, which is mounted to the upper surface of the instrument panel, is inclined at an angle ranging from 60° to 75° with respect to a horizontal surface, and the airbag module, which is mounted to the front surface of the instrument panel, is parallel to the horizontal surface or is inclined at an angle ranging from 0° to 15° with respect to the horizontal surface.

5. The low risk deployment passenger airbag system using the slim type passenger airbag module as set forth in claim 3, wherein the cushion of the airbag module, which is mounted to the upper surface of the instrument panel, has a volume ranging from 60 L to 120 L, and the cushion of the airbag module, which is mounted to the front surface of the instrument panel, has a volume ranging from 30 L to 70 L.

6. The low risk deployment passenger airbag system using the slim type passenger airbag module as set forth in claim 3, wherein an angle between the airbag module, which is mounted to the upper surface of the instrument panel at an incline, and the airbag module, which is mounted to the front surface of the instrument panel parallel thereto or at an incline, is 60°.

7. The low risk deployment passenger airbag system using the slim type passenger airbag module as set forth in claim 1, wherein a distance between centers of the two passenger airbag modules, which are respectively mounted to the upper surface and the front surface of the instrument panel, is within a range from 100 mm to 250 mm, such that, when a vehicle crash occurs, two cushions of the passenger airbag modules are horizontally deployed towards the passenger seat in conjunction with each other.

8. The low risk deployment passenger airbag system using the slim type passenger airbag module as set forth in claim 7, wherein the airbag module, which is mounted to the upper surface of the instrument panel, is inclined at an angle ranging from 60° to 75° with respect to a horizontal surface, and the airbag module, which is mounted to the front surface of the instrument panel, is parallel to the horizontal surface or is inclined at an angle ranging from 0° to 15° with respect to the horizontal surface.

9. The low risk deployment passenger airbag system using the slim type passenger airbag module as set forth in claim 7, wherein the cushion of the airbag module, which is mounted to the upper surface of the instrument panel, has a volume ranging from 60 L to 120 L, and the cushion of the airbag module, which is mounted to the front surface of the instrument panel, has a volume ranging from 30 L to 70 L.

10. The low risk deployment passenger airbag system using the slim type passenger airbag module as set forth in claim 7, wherein an angle between the airbag module, which is mounted to the upper surface of the instrument panel at an incline, and the airbag module, which is mounted to the front surface of the instrument panel parallel thereto or at an incline, is 60°.

* * * * *